June 16, 1964 A. KOHLER 3,137,530
HYDROSTATIC BEARING
Filed Oct. 10, 1962
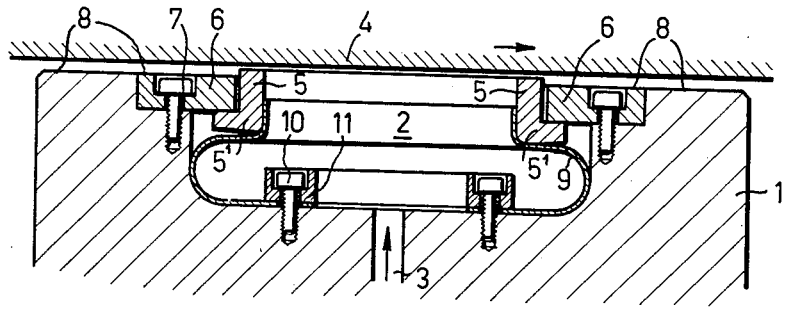
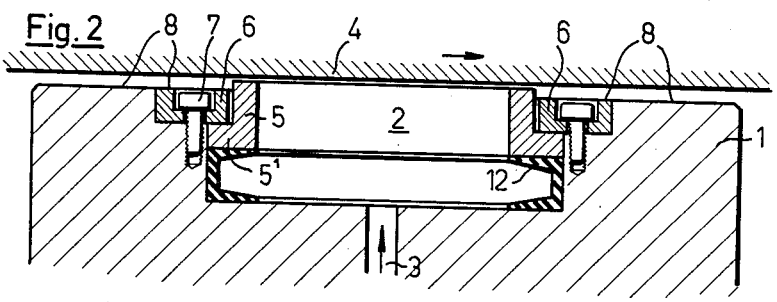
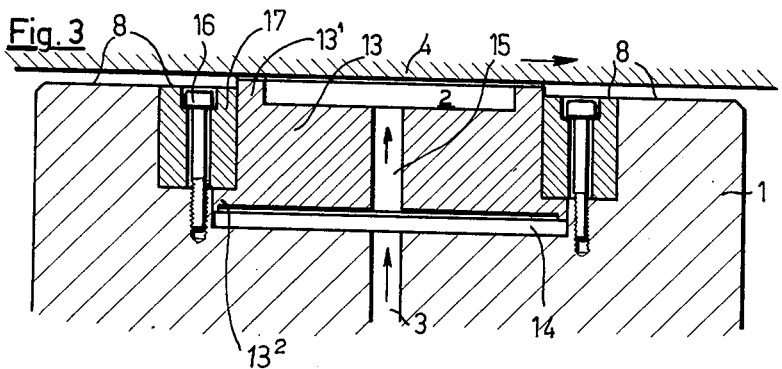
INVENTOR.
Arnold Kohler
BY
Dodge and Sons
Attorneys

United States Patent Office 3,137,530
Patented June 16, 1964

3,137,530
HYDROSTATIC BEARING
Arnold Kohler, Zurich, Switzerland, assignor to Escher Wyss Aktiengesellschaft, Zurich, Switzerland, a corporation of Switzerland
Filed Oct. 10, 1962, Ser. No. 229,597
Claims priority, application Switzerland Oct. 20, 1961
5 Claims. (Cl. 308—5)

This invention relates to a hydrostatic bearing which comprises a bearing member having at least one pocket provided in the slide surface, supplied with lubricant under pressure and thereby forming a liquid cushion for the sliding part.

Hydrostatic bearings of this kind are used for example for the work tables and spindles of machine tools, especially for the flat bearings of lathes. The support of the sliding part on liquid cushions provides a bearing having low friction losses. In practice, such losses occur only in the comparatively thin lubricant films on the slide surface surrounding the liquid cushion.

In bearings of this kind, however, it is often required that they should be serviceable, at least for a certain time, in the event of failure in the supply of lubricant under pressure, without the bearing being damaged. Comparatively large slide surfaces must be provided around or adjacent to pockets, if excessively high specific surface pressure is to be avoided in the event the supply of lubricant under pressure to the pockets is interrupted. On the other hand to avoid high lubricant consumption and high pump capacity for the production of pressure in normal operation, small gap widths must be maintained at the edge of the pocket, these large slide surfaces, in conjunction with the small gap widths, cause considerable frictional losses in normal operation, so that the advantages of the hydrostatic bearing cannot be fully utilized.

In a hydrostatic bearing of the kind hereinbefore described, the invention meets this disadvantage by the fact that the pocket forming the liquid cushion is bounded along its periphery by a comparatively narrow edge piece or rim, and this edge piece or rim is inserted movable in the bearing member in such a manner that under the influence of the lubricant pressure it is lifted by a small amount as far as a stop above the slide surface surrounding the edge piece.

Due to this step, in normal operation, the slide surface active only for the exceptional case of failure in the supply of lubricant supply, and situated outside the pressure-liquid cushion is at a comparatively large distance from the part sliding thereon, and the velocity gradient in the lubricant film, and hence also the friction losses, become small.

In the accompanying drawing, three different embodiments of the subject of the invention are represented in simplified form by way of example. FIGS. 1 to 3 each show a cross section through such embodiment of a hydrostatic bearing.

According to FIG. 1, a bearing member 1 has a pocket 2, supplied with liquid lubricant under pressure through a central duct 3 by means not shown. The pocket 2 filled with lubricant forms a liquid cushion for a part 4 sliding on the bearing member 1.

The pocket 2 is bounded along its circumference by a comparatively narrow edge piece or rim 5, engaging by means of a projection 5' under plates 6, inserted on both sides of the edge piece or rim 5 in the bearing member 1, to which they are secured by screws 7. The surface of the plates 6 forms a slide surface 8 with the surface of the bearing member 1. The edge piece or rim 5 is slidable in a direction perpendicular to the slide surface 8. In its top position, it bears by the projection 5' against the plates 6, which then act as stops. In this position, its upper edge projects by a small amount above the slide surface 8.

The gap between the movable edge piece or rim 5 and the bearing member 1 or the plates 6 inserted therein is sealed by a diaphragm or bellows 9, on the one hand fixed to the edge piece or rim 5, and on the other hand pressed against the bottom of the pocket 2 by a ring 11 fixed by screws 10 to the body of the bearing member 1. The lower surface of the piece 5 is exposed to the lubricant pressure which prevails in the pocket 2.

The device acts as follows:

When liquid lubricant is introduced under pressure into the pocket 2 through the duct 3, the edge piece or rim 5 is lifted by the action of this pressure until it abuts against the plates 6 by the projection 5', and its upper side then projects a slight amount above the slide surface 8. In the pocket 2, a liquid pressure adjusts itself, which maintains equilibrium with the load exerted by the sliding part 4. The latter therefore rests on a liquid cushion.

The gap between the part 4 and the edge piece or rim 5 adjusts itself so that under the action of this pressure, the quantity of lubricant delivered by the pump escapes from the pocket 2 through said gap.

The lubricant gap width between the slide surface 8, situated outside the edge piece or rim 5, and the part 4 is now substantially larger than between the edge piece or rim 5 and the part 4. At that place therefore, in the lubricant film there is only a slight velocity gradient. The shear stresses are therefore small and the liquid friction on the slide surface 8 is slight. Higher shear stresses occur solely in the case of the narrow gap between the edge piece or rim 5 and the sliding part 4. Since, however this narrow gap is confined to a very narrow strip along the circumference of the pocket, the frictional force is not important at this place also.

In normal operation, therefore, the device permits low lubricant consumption the be obtained at the same time as low frictional force. Notwithstanding, it is however capable of ensuring operation free from damage, at least for a certain time, also in emergency cases in the event of failure in the pump pressure. In the event of deficient lubricant pressure, the edge piece or rim 5 will be pressed down by the load of the part 4, with compression of the diaphragm 9, until its upper edge arrives almost in the plane of the slide surface 8. The gap between the latter and the part 5 becomes smaller. The surface 8 is made so large that the load due to said part 4 can be taken up by said surface without exceeding the permissible specific surface pressures.

The embodiment according to FIG. 2 differs from that according to FIG. 1 merely by the fact that the diaphragm 9 is replaced by a soft packing 12 inserted in the pocket 2 on the lower side of the edge piece or rim 5.

According to FIG. 3, the pocket 2 forming the liquid cushion is arranged as a recess with a relatively narrow rim 13¹ in a body 13, which is movable perpendicularly to the slide surface 8 and is inserted in the bearing member 1 in a corresponding cavity 14 also to be supplied with liquid lubricant under pressure. The lubricant is led through the duct 3 first into the space left between the body 13 and the bottom of the cavity 14, whence it passes into the depression 2 through a duct 15 machined in the body 13. Since the lower surface of the body 13 is larger than the surface of the pocket 2, due to the liquid pressure, the entire body 13 is raised until its projection 13² bears against a stop formed by a beam 17, inserted in the bearing member 1, to which it is secured by screws 16. The rim 13¹ then projects by a slight amount above the slide surface 8. The effect is the same as in the embodiments according to FIGS. 1 and 2.

The embodiments shown by way of example relate to bearings with flat slide surfaces. In fundamentally the same way, however, the invention may also be applied to bearings with curved slide surfaces, for example the radial bearings of a spindle.

What is claimed is:

1. A pressure lubricant bearing structure of the type including a bearing member having a slide surface; a sliding part on the slide surface; at least one pocket formed in the slide surface; means, mounted in sealing relation to said pocket and slidable in a direction perpendicular to the sliding part, said means having a longitudinal opening therethrough and having an endless bearing surface formed on its outer end encircling said opening, said means being so dimensioned as to be fully retractable into said pocket; stop means to limit outward movement of said means so that its outer end then projects from the slide surface; and a supply connection through which lubricant under pressure may be delivered to said pocket beneath said means, to urge it outward against said stop means, said lubricant under pressure, when said means engages said stop means serving to lift the sliding part from said bearing surface and provide a gap for the discharge of lubricant delivered to the pocket.

2. A pressure lubricant bearing structure comprising a bearing member having a slide surface and at least one lubricant receiving pocket; an edge piece forming the circumferential boundary of said pocket, inserted in said bearing member so as to be movable in the direction perpendicular to the slide surface; resilient sealing means arranged between said edge piece and the bearing member in such a manner that the lubricant pressure in said pocket tends to lift said movable edge piece; and stop means limiting the lifting movement of said edge piece to a position in which it projects by a small amount above the slide surface of the bearing member.

3. The bearing structure defined in claim 2 in which the sealing means consist in a diaphragm.

4. The bearing structure defined in claim 2 in which the sealing means consist in a soft packing.

5. A pressure lubricant bearing structure comprising a bearing member having a slide surface; at least one cavity in said bearing member; a body inserted in said cavity so as to leave a space between the said body and the bottom of the cavity and to be movable in the direction perpendicular to said slide surface of the bearing member; said body having at its outer surface a recess forming a lubricant receiving pocket and bounded by a small circumferential rim, a flow connection being provided between said space and said recess; the respective faces of the body directed toward said recess and toward said space being dimensioned in such a manner that the body is lifted by the action of the lubricant pressure; and stop means limiting the lifting movement of said movable body to a position in which said body projects by a small amount above the slide surface of the bearing member.

References Cited in the file of this patent

UNITED STATES PATENTS

| 1,117,500 | Kingsbury | Nov. 17, 1914 |

FOREIGN PATENTS

| 899,172 | Germany | Dec. 10, 1953 |